April 19, 1960    A. E. ZIERICK    2,932,991
HYDRAULIC CLUTCH AND TURBINE DRIVE
Filed July 30, 1958    6 Sheets-Sheet 1

FIG.1

INVENTOR
Ambrose E. Zierick

April 19, 1960     A. E. ZIERICK     2,932,991
HYDRAULIC CLUTCH AND TURBINE DRIVE Filed July 30, 1958     6 Sheets-Sheet 2

INVENTOR
Ambrose E. Zierick

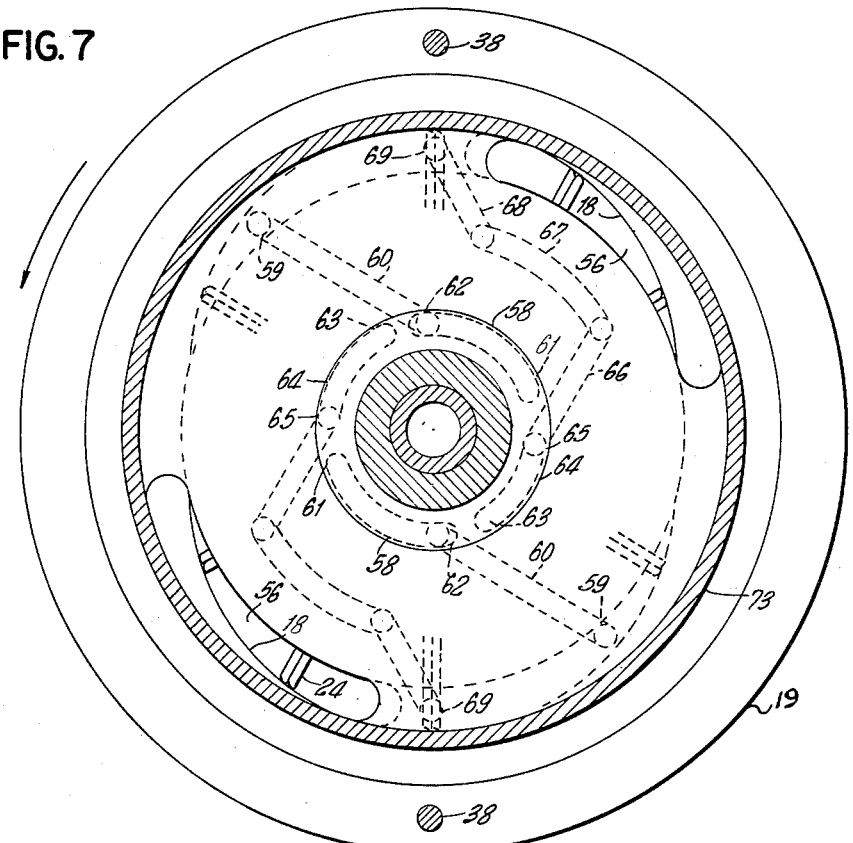
FIG. 7
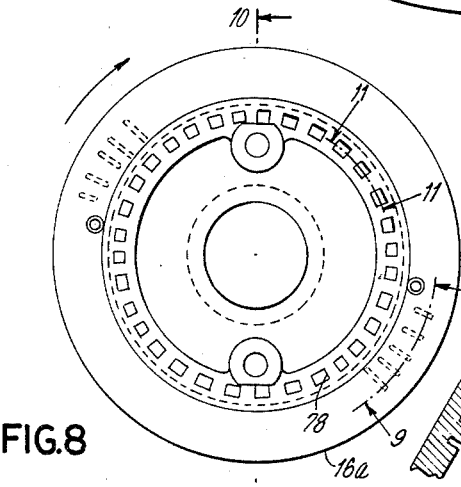
FIG. 8
FIG. 9
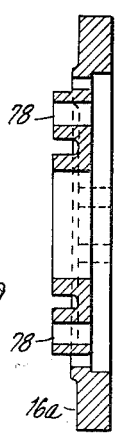
FIG. 10
FIG. 11
INVENTOR
Ambrose E. Zierick April 19, 1960  A. E. ZIERICK  2,932,991
HYDRAULIC CLUTCH AND TURBINE DRIVE
Filed July 30, 1958  6 Sheets-Sheet 4

INVENTOR
Ambrose E. Zierick

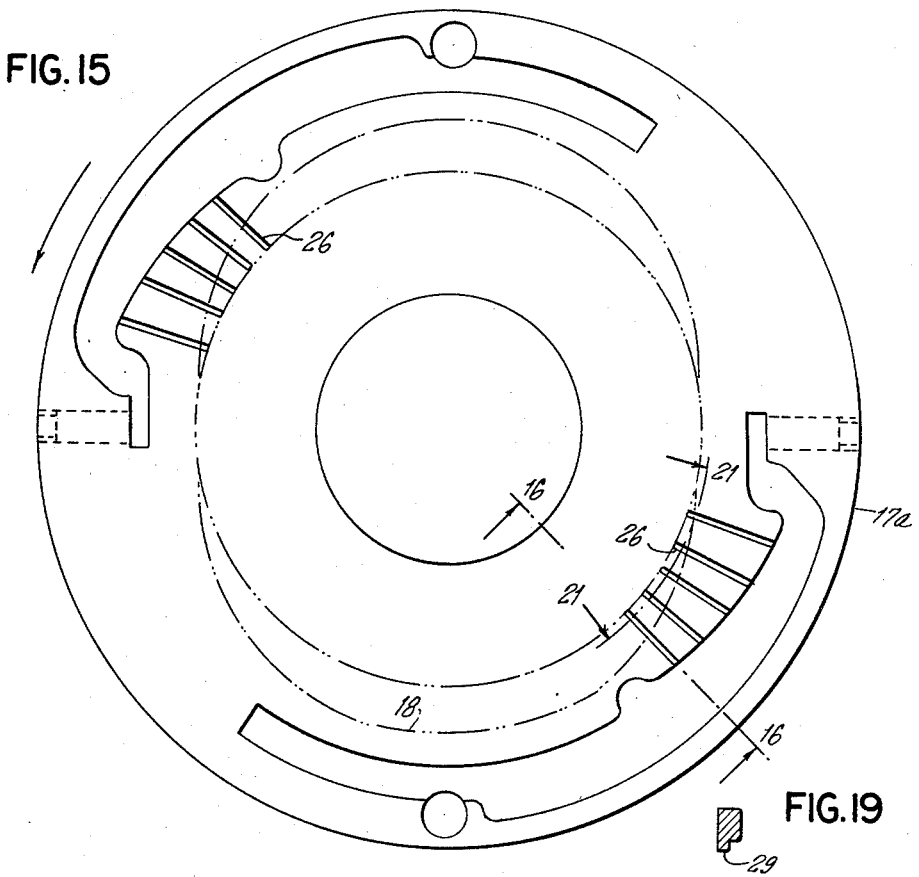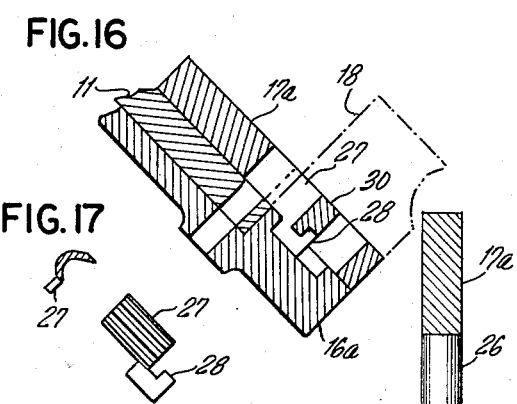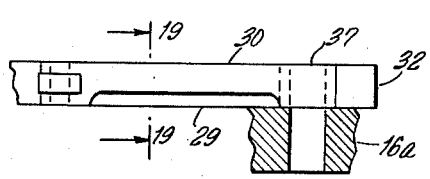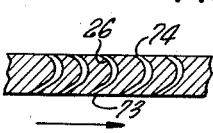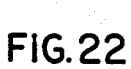

April 19, 1960    A. E. ZIERICK    2,932,991
HYDRAULIC CLUTCH AND TURBINE DRIVE
Filed July 30, 1958    6 Sheets-Sheet 6
FIG. 23
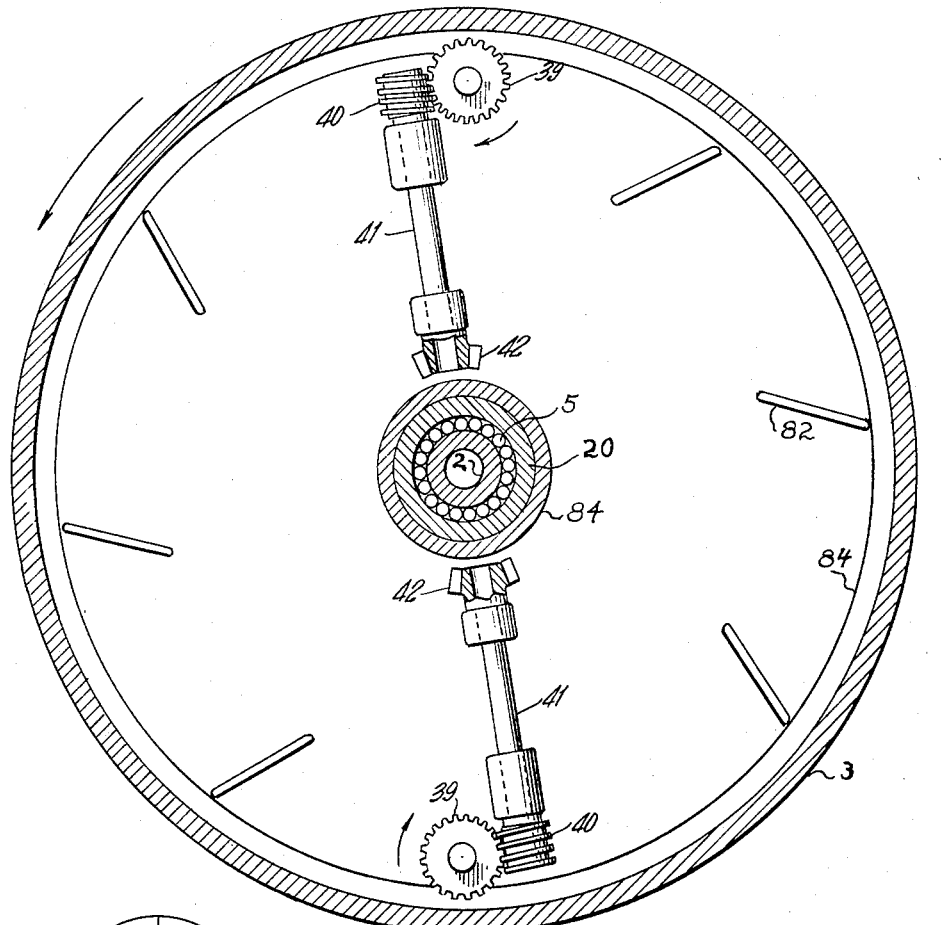
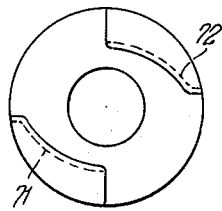
FIG. 24
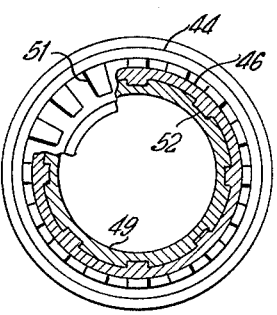
FIG. 26
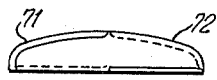
FIG. 25
INVENTOR
Ambrose E. Zierick

United States Patent Office 2,932,991
Patented Apr. 19, 1960

2,932,991

HYDRAULIC CLUTCH AND TURBINE DRIVE

Ambrose E. Zierick, Bronx, N.Y.

Application July 30, 1958, Serial No. 752,054

5 Claims. (Cl. 74—794)

My invention relates to certain new and useful improvements in hydraulic clutch and turbine drive in which the output speed of the driven element is varied by fingertip control, also in which the torque increases as the speed decreases.

With the above basic object in view, this invention is principally applicable in the automotive field in conjunction with motorcycles, automobiles, trucks, tractors, tanks, bulldozers, farm machinery, portable electric drills, electric motors for power presses, machine tools, textile and automatic machinery, and in general, all types of transmissions.

The novelty of the present device consists of the addition of planetary gear reduction and a unique method for controlling the volume of jets spurting through the turbine interstices without leakage.

The most convenient embodiment of my invention contemplates an input source of prime power driving within an enclosed hydraulic vessel as in Fig. 1, which is a transverse section of Fig. 2 taken on line 1—1.

Fig. 7 is in part a cross section view taken on line 7—7a—7b—7, Fig. 1 with hub contraction for convenience.

Fig. 8 is a full face view of second stage turbine wheel or flange.

Fig. 9 is a segmental cross section taken on arc 9—9, Fig. 8.

Fig. 10 is a cross section of Fig. 8.

Fig. 11 is a segmental cross section of turbine blades taken in arc 11—11, Fig. 8.

Fig. 15 is a detail face view of turbine jet wheel of Fig. 12.

Fig. 16 is a collective fragmentary section of Fig. 15, showing jet blocker detail taken on line 16—16.

Figs. 17 and 18 show end and face views of turbine jet blocker.

Fig. 19 is a cross section of Fig. 20 taken on line 19—19.

Fig. 20 is a detail assembly of jet blocker lever.

Fig. 21 is a segmental cross section showing turbine jet ducts taken on arc 21—21, Fig. 15.

Fig. 22 is a detail view of turbine jet slot similar to Fig. 16 without blocker.

Fig. 23 is in part a cross section of Fig. 1, taken on line 23—23.

Fig. 24 is a face view of scoops.

Fig. 25 is an end view of Fig. 24.

Fig. 26 is in part a cross section of control knobs taken on line 26—26, Fig. 1 with central portion deleted.

Figure 2:
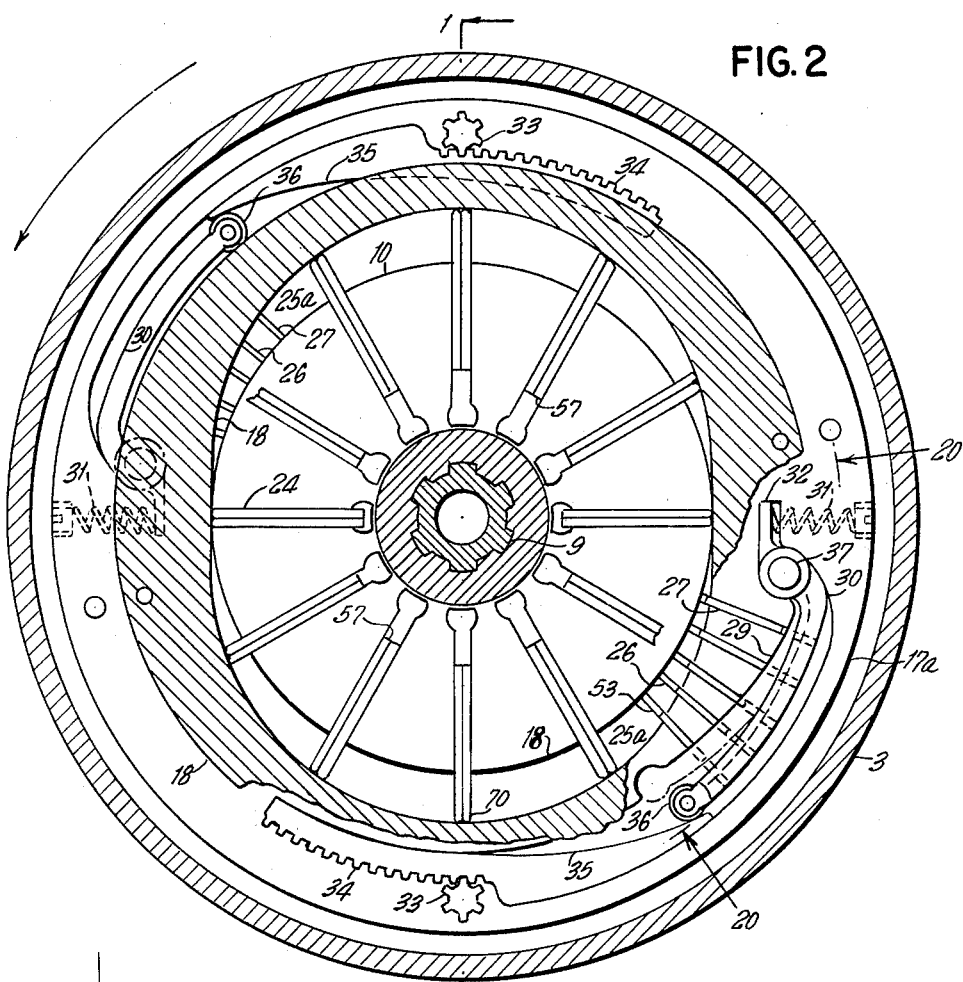
Fig. 2 is a cross section of Fig. 1 taken on line 2—2.

Referring now to Fig. 1, wherein like numbers designate like parts throughout and with figure numeral designations synonymous with section numerals, in which drive shaft 1 in this particular set up is a standard pulley drive shaft found on any conventional electric motor.

Drive shaft 1 supports spindle 2 upon which hydraulic vessel 3 is rotably mounted on ball bearings 4, and indirectly on needle bearing 5 through bearing 21a. Shaft 1 is keyed at 6 and secured by set screw 7, driving in fixed relation to motor shaft for transmitting an input source of power at constant motor speed.

Figure 12:
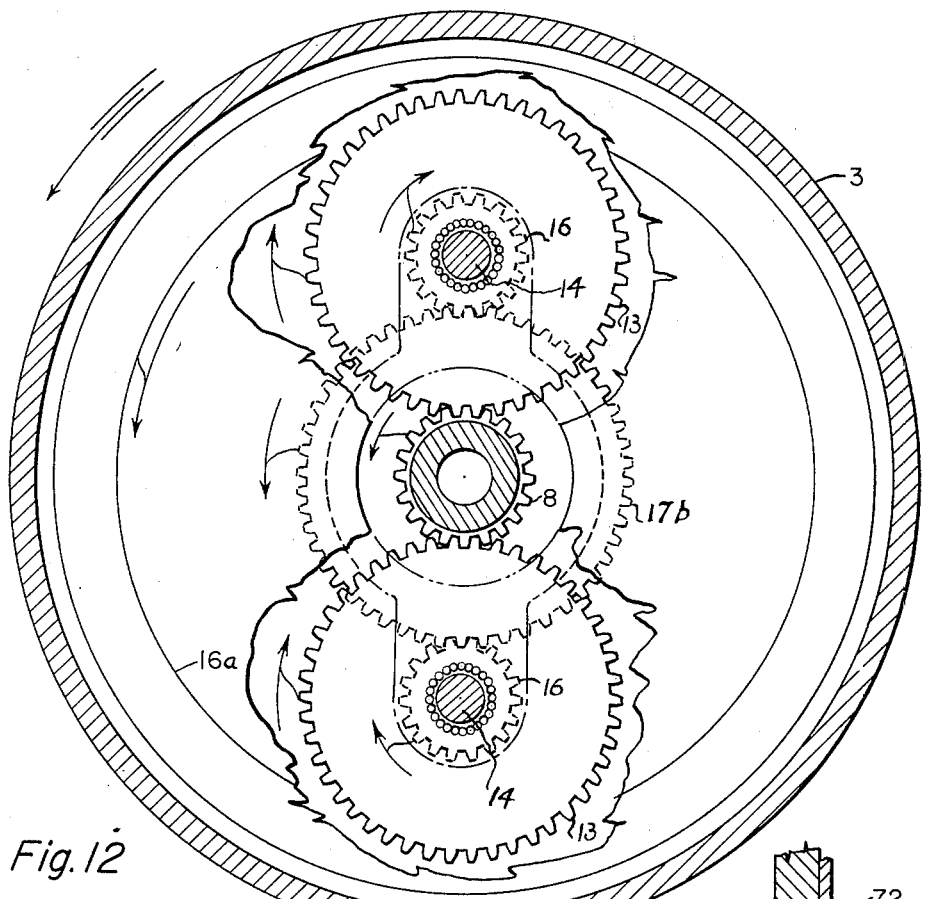
Fig. 12 is a cross section view of a planetary gear reduction with center ball bearing deleted taken on line 12—12, Fig. 1.

Spindle 2 has an integral pinion or sun gear 8 in constant mesh with planetary gear train Fig. 12, and an integral spline 9 which slidingly mounts rotor 10, Fig. 2, the latter also being in constant mesh. Rotor 10 has a turbine reactance wheel 11 keyed at 12 in fixed rotative relation to spindle 2, shown detailed in Figs. 3 to 6.

The aforementioned group consisting of pinion 8, splined rotor 10 and turbine reactance wheel 11, rotate in fixed relation with spindle 2. Satellite gears 13 meshed with sun gear 8 are mounted on studs 14 journaled with needle roller bearings 15. Hardened studs 14 are assembled in flange 16a, the latter rotating on ball bearing 17. Planetary gear mesh is completed by satellite pinion 16 rotating around gear 17b integral with hydraulic vessel 3, in which pinion 16 is integrally fixed with gear 13.

Figure 13:
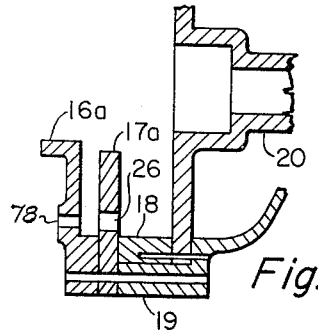
Fig. 13 is a fragmentary cross section view of spindle collectively shown with Fig. 8, cam ring and turbine disc assembled.

Flange 16a is assembled with jet turbine disc 17a, cam ring 18, outer cylinder 19 and sleeve flange 20, which are shown assembled in Fig. 13. This group rotates at an intermediate speed between input source of power furnished by motor shaft 1 and take-off power of V-pulley 21 on hydraulic vessel 2.

For instance, hypothetically this intermediate group rotates on bearing 17 and on needle roller bearing 5, being induced by pinion 8 to turn studs 14 circularly through meshing with gears 13, which in this case is only possible when V-pulley 21 is stationary and pinion 17b resists turning due to a normal permissible load resisting torquewise on V-pulley.

In practical operation studs 14 are controlled in their turning by having hydraulic vessel 2 filled three-fourths full of hydraulic fluid through plugs 22 and 23, thereby obtaining a pump action resistance with sliding vanes 24 forcing a compression of fluid in chambers 25a between the rotor 10, vanes 24, and cam 18 with side walls closed to allow no seepage of fluid, as shown in Fig. 2. In this second instance, instead of the studs 14 turning freely the compression resistance forces V-pulley to turn, which speed of rotation is equal to the maximum obtainable through motor shaft coupling transmitted through pinion 8.

Speed control is effected by regulating the hydraulic fluid of compression in chamber 25 to discharge with a jet like action through turbine slots 26, which forces the output speed to back-off or slow down to a slower speed proportionately.

The foregoing rotor and sliding radial vane pump action is more fully described in my patent applications Serial No. 238,699, filed July 21, 1951 and subsequent filing of Serial Nos. 456,385 and 486,559.

In my instant patent application the blocking of turbine slot 26 are sealed by form fitted turbine profile blades 27, detailed in Figs. 17 and 18, which slide radially from closed to open position. Hooks 28 are integral with the turbine blades 27 and are shown assembled in coupled engagement with lever arm 29 integral with lever 30, Fig. 2 and Fig. 20. Spring 31 depresses arm 32 tending to keep profile blades 27 in a normally open position as shown, although they are fitted so as to be air tight when closed. Any degree of opening may be obtained by pinion 33 turning against rack 34, thereby shifting cam 35 circumferentially against roller 36 which tends to force lever 30 to close all of the profile blades simultaneously inwardly by a pivotal movement on stud 37. There are two diametrical opposite disposed sets of profile blades and levers with racks and pinions, operating in unison with lever arms 29, the latter being in coupled engagement with their respective profile blades 27, as shown in Fig. 2. In the present instance these are outwardly disposed when pinions 33 are positioned as shown, and the hydraulic functioning causes a centrifugal stress tending to force the profile blades into maximum opening in their respective turbine slots 26, with additional stress.

In Fig. 1 pinions 33 are integral with shafts 38 and are each fitted with their left and right worm wheel 39, Fig. 23, which mesh with worm screw 40 mounted on radial shafts 41 with their inner ends each fitted with bevel pinions 42, engaging a bevel gear sleeve 43, which revolves in bearing 21a and is journaled around sleeve flange 20 for speed setting adjustment.

Bevel gear sleeve 43 coacts in rotation with flange sleeve 20 in their respective bearings 21a and 5, and is independently turnable on flange sleeve, only for making output speed changes by adjusting the exterior speed knob 44, which is securely fastened by thread 45 to bevel gear sleeve 43.

The end exterior looking knob 46 is carried by knob adapter 49, and is inwardly and outwardly slidable on journal 47 and spline 52, Fig. 26, and is inwardly depressed by spring 48 against serrated jaws 51, of speed control knob 44 to keep the latter in locked position after speed adjustment has been made. The spline 52 keeps locking knob in non-rotative position and when knob is pulled out to disengage from jaws 51 speed adjustment can be made freely at will with speed control knob 44.

In Fig. 2 turbine slots 26 are in full open position to allow hydraulic compression to be discharged therethrough with jet like action, which imparts the slowest output speed with maximum torque transmitted on takeoff V-pulley 21.

When a change of speed setting is desired from the present low speed as shown, the speed control knob 44 is turned to the right by pulling out locking knob 46 and turning it for any prearranged adjustment which is relayed through bevel gear sleeve 43 and through their respective oppositely disposed linkage to pinions 33 for rack, cam and roller pivotal level action, thus radially sliding inwardly profile turbine blades 27, Fig. 2, thereby obtaining a higher speed, reaching maximum speed when turbine slots are fully closed.

An inherent advantage obtainable in the instant structure and functioning of my invention, is that the profile turbine blades 27 are only opened to a designated point, slightly above the surface of cam 18, while heretofore all other types of radial sliding vanes 24 have had a corner 70 of which when passing an open turbine slot would allow a leakage of pressure to escape therethrough uneconomically. Geometrically and physically this is corrected by having the ends 53, Fig. 2, of profile turbine blades jutting above the surface of cam 18, thereby shutting off this leakage escape.

An additional advantage in the above structure Fig. 1, lies in the rigid side walls which are in a fixed position, especially the side wall on turbine disc 17a, which has a rigid surface and no side leakages when turbine slots are either open or closed, especially in the latter instance.

Figure 6:
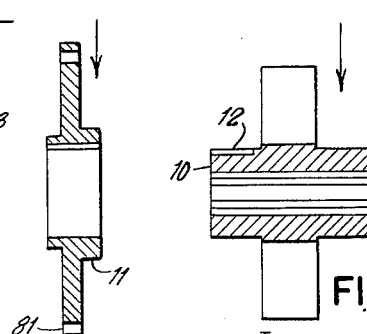
Fig. 6 is a cross section of pump rotor.

Rotor 10, Fig. 6, has a splined bore which is assembled on spline 9, integral with spindle 1, Fig. 1, and is free to align between fixed and rigid compression side walls of turbine disc 17a and 55, the latter integral with sleeve flange 20.

In Fig. 7 side wall 55 is shown with diametrical opposite arcuate openings 56 serving as the intake for hydraulic compression. The cam 18, best shown in Fig. 2, is identically located in Fig. 7, of which the latter with side wall 55, may be superimposed on Fig. 2.

The rotor 10 with its centrifugally stressed radial sliding vanes 24 makes two compressions each revolution and for additional effectiveness in sealing the vanes against the contour surface of the cam 18 while sliding radially in and out, a hydraulic force is induced on the inner ends at 57 of the radial sliding vanes 24, Fig. 2, which is obtained through inner arcuate slots 58, Fig. 7.

The source of hydraulic pressure is obtained through inlet ports 59, Fig. 7, flows through diagonal ducts 60 and into open arcuate slot 58, from which the hydraulic pressure discharges onto the inner ends of vanes 24 at point 57, Fig. 2, as the vanes pass by in rotation. The pressure cycle on the vanes starts at diametrically opposite points at 61 when the radial vanes are on their outward thrust and under centrifugal stress, continuing towards a terminating point at 62, where pressure is allowed to lapse and is sufficient for the rest of the pump cycle. From point 63 on, open arcuate slot 64 provides a discharge outlet terminating at 65, where the discharge medium flows through closed diagonal ducts 66, through arcuate ducts 67, diagonal ducts 68, and discharges through ports 69, which is the preliminary outer area starting space of pressure chamber.

It is obvious that the oppositely arranged compression chambers of instant device Fig. 2, discharges the hydraulic medium through turbine slots 26, with the pumping action of rotor 10, Fig. 2, and detailed in Fig. 6, being in a clockwise rotation. Hydraulic intake is made through oppositely arranged arcuate openings 56, Fig. 7, being forced there through by impeller scoops 71 and 72, Fig. 1, shown detailed in Figs. 24 and 25.

In forcing the hydraulic medium through arcuate slots 56, also being stressed by centrifugal force from around annulas 73, Fig. 1, the medium is carried between sliding vanes 24 best discernible in Fig. 2, to be pressurized and ejected in jet like pressure through turbine slots 26, the latter shown in detail, Figs. 15, 16, 21 and 22.

Figure 3:
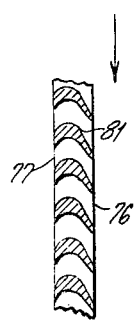
Fig. 3 is a segmental cross section of turbine blades taken on arc 3—3, Fig. 4.
Figures 4, 5:
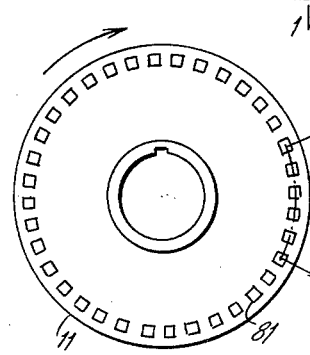
Fig. 4 is a full face view of turbine reactance wheel Fig. 5.
Fig. 5 is a cross section of turbine reactance wheel.

The direction of the jet flow is shown in Fig. 21 entering slots at 73 to emerge at 74, thereupon to be forcibly reacted upon by reactance turbine wheel 11, Fig. 1, detailed in Figs. 4 and 5, in which Fig. 3 shows diagrammatically the jet action entering turbine slots 81 on side 76, to emerge at 77.

From this discharge point on the jets, expends its final energy through slots 78, Fig. 1, and detailed in Fig. 8 and Fig. 10, in which Fig. 11 again shows the jets entering side of turbine slots at 79 to discharge finally at 80.

Figure 14:
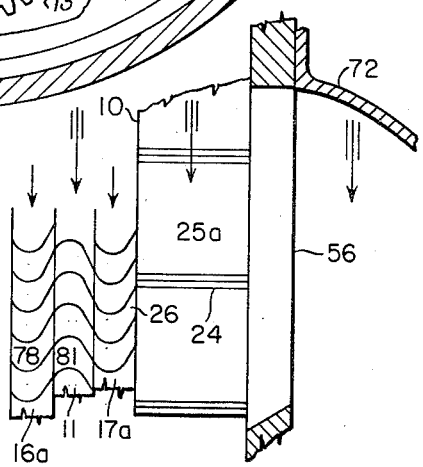
Fig. 14 is a diagrammatical view of turbine jet action in sequence.

On Fig. 14 the jet flow is depicted in diagrammatic technique from around annulas 72, through port 56 and into compression gap 25a to be acted upon by action of rotor 10 and forced into turbine slots 26 of turbine disc 17a, and thence into turbine slots 81 of reactance turbine wheel 11, and finally through slots 78 of flange disc 16a.

It is apparent that the rotor 10 as depicted diagrammatically in Fig. 14, rotates in fixed relation with turbine reactance wheel 11 and they both do all the driving in unison to expend their hydraulically combined energies and imparting torque to turbine disc 17a and turbine flange 16a collectively in sequence. A differential in speed between driving and driven elements is obvious and is further manifested in the planetary gear differential in Fig. 12. The pinion 8 discernible in Fig. 1, is also driving in fixed relation with rotor 10 and turbine reactance wheel 11, which speed is always in fixed relation to the incoming speed obtained from the motor driven spindle 2.

In the aforementioned turbine disc 17a which is driven and is regulatory of the output speed, a series of diametrically disposed turbine slots and their radial sliding profile blade blockers 26, Fig. 2, is made adjustable in their respective openings by speed control and locking knobs 44 and 46 respectively, as shown in Fig. 1.

It is apparent when pinion 8, Fig. 12, rotates counter-clockwise with any aforesaid differential speed that may exist, the hydraulic vessel 3 must rotate at a slower speed also counterclockwise in the same direction. It is also apparent that when Fig. 12 is superimposed on Fig. 2, all components of torque are being expended in the same direction. It therefore is apparent that a torque transmitted from pinion 8 must transmit through a planetary gear ratio which increase or multiplication in torque is obvious and the increase would be equal to the gear ratio plus whatever energy the turbine effect could recapture minus friction, which combined torque effect would be transmitted at the power take-off V-pulley 21, Fig. 1.

When the hydraulic vessel 3, Fig. 1 rotates with three-fourths full of hydraulic fluid the centrifugal force keeps the liquid medium at the outer extremities of the vessel on the inner side and the blades 82 tends to keep the liquid medium out of the enclosed inner central space 83, which exists between worm wheel disc 84 and inside wall 85 of hydraulic vessel 3. The inner central space being void of liquid medium tends to keep the annulas 73 and its immediate annulas space full of hydraulic medium to prevent cavitation of the latter.

It is also apparent that oil retainers are located at points 54, 54a and 54b to prevent oil leakages. Release valve 75 allows inner air compression to escape when pressure exceeds a given minimum, which feature has been covered by one of my previous patents, as aforementioned. A jack-off thread 25, Fig. 1 is primarily used for inserting a long special bolt to jack-off hydraulic device from motor shaft by first removing speed control knobs in order to use such bolt of special design.

It is also apparent that the present device shows a unit of moderate size for power transmitting and in larger units, with a greater increase of power the power take-off V-pulley may be substituted by a gear or sprocket drive to transmit heavier loads.

The construction herewith illustrated shows a convenient form of my invention in which a planetary gear train is made to vary its output speed transmission hydraulically by finger tip controls and in its present form is one embodiment which is susceptible to include other modifications and controls, especially as shown in my patent application Serial No. 238,699, which has the speed control centrally linked up with the escaped discharges from unblocked turbine slots.

Having thus described a preferred embodiment of my invention, what I claim as new and desire to secure by Letters Patent is set forth in the following claims.

I claim:

1. An improved hydraulic clutch comprising in combination a hydraulic vessel, a driving shaft centrally journaled in said vessel, an inner spindle having a plurality of discs with an affixed cylinder journaled coaxially with said shaft, studs on the outer side of said discs, a satellite gear train in mesh with said shaft and rotating on said studs, a rotor splined to said shaft, a plurality of radially extending vanes slidably retained within radial disposed slots in said rotor, the outer ends of said vanes being in slidable contact with the internal surface of a cam ring fixed with respect to said cylinder carried by one of the inner of said discs, said satellite gears having coaxial pinions rotating in mesh around a central coaxial sun gear fixed with respect to said vessel, aforesaid gears being disposed in planetary gear mesh action, an outer disc with port slots adjacent to said rotor, a quantity of hydraulic fluid in said vessel, scoop blades circumferentially disposed outside of said port disc and synchronized with said radial vanes of said rotor, an inner disc immediate to other side of said rotor provided with turbine slots, said turbine slots being in communication with rotation of said vanes on said rotor from said scoop blades through said port disc, a jet blocking means for regulating the flow of fluid discharging through said turbine slots, the torque of said driving shaft being transmissible through said hydraulic fluid to the said cam ring in coaction with said planetary gear train and means formed on the external periphery of said vessel for power take-off and exterior regulating means on said jet blocking means for regulating output speed on said power take-off.

2. An improved hydraulic clutch comprising in combination a rotatably mounted hydraulic vessel provided with power take-off means and containing hydraulic fluid, driving means axially journalled in said vessel including a drive shaft, a rotor affixed to said shaft and provided with radially extending slots, vanes slidably mounted in each of said slots, a cam ring fixed with respect to said outer vessel and surrounding said rotor and contactable with the outer ends of said vanes, whereby the disposition of said vanes is variably limited, a port disc disposed on one side of said rotor and including diametrically disposed apertures communicating between the interior of said vessel and a portion of said rotor vane gaps, said disc closing off communication between said vessel and the remaining portion of said rotor vane gaps, an opposite disc including a diametrically disposed plurality of turbine slots on the other side of said rotor, profile blocking blades including integral hooks radially slidable in each of said turbine slots, rocking levers including rollers diametrically disposed in hook engagement with said hooks of said blocking blades for sliding said blocking blades in and out of said turbine slots for controlling flow of pump action of hydraulic jets there through, oppositely disposed variable arcuate cams engaging said roller of said rocking lever, arcuate racks integral with said arcuate cam, pinions engaging said arcuate cam racks to oscillate said rack and cam, an outer means for turning said pinions thereby controlling output speed of said power take-off means.

3. A device according to claim 2 said port disc having diametrically oppositely disposed arcuate charging channels open on the side facing said rotor and immediate to passage of inner ends of said moving vanes, a closed oblique duct leading from one end of each of said arcuate channels, intake ports at the other end of each of said closed oblique ducts, said ports being respectively adjacent to said oppositely disposed compression chambers for pressurized fluid to flow there through from said port, said oblique ducts, said charging channels, onto said ends of passing vanes to force said sliding vanes against said cam slope, said arcuate channel terminating to allow the fluid pressure to ease off as said cam slope eases off, and an additional diametrically oppositely disposed arcuate discharge channel with an opening towards said ends of passing vanes, a closed oblique duct terminating into an arcuate spur leading from one end of each of said arcuate discharge channels, a discharge port at each outer end of said oblique arcuate spur adjacent to said precompression chamber, said discharge being operative to relieve said fluid pressure from said inner ends of said vanes when sliding nearly halfway up on the rise of said cam, said hydraulic pressurizing and said discharge action having a pressure differential tending to obtain a more efficacious functioning of said vanes in their hydraulic pumping cycle for turbine jet action.

4. A device according to claim 2 said inner spindle having a plurality of turbine discs and affixed cylinder thereon, said discs and spindle journaled coaxially with said shaft, studs on the outer side of said end disc, a sun pinion gear integral with said shaft, a satellite gear train in mesh with said sun gear and rotating on said studs, a central gear integral with said vessel, satellite pinions integral with each of said satellite gears, said sun pinion driving said satellite gear, said integral satellite pinions driving torquewise said central gear for driving torquewise said hydraulic vessel, said rotor action being in common torquewise rotation against said cam coacting to induce said pump action, a reactance turbne impeller affixed to said inner spindle rotating between inner side of said stud disc and adjacent to other said turbine disc, the aforesaid pump action being operative to force jets through said turbine jet disc torquewise, through said reactance turbine impeller torquewise, through turbine slots on said end stud flange disc torquewise, said combined pump and turbine jet action hydraulicly coacting with said planetary gear train for rotating said hydraulic vessel and said power take-off.

5. A device according to claim 4 on said slidable profile blockers, means provided for controlling said profile blockers to slide to open and to closed positions or any variation thereof, thereby changing said jet pumping action from zero to full volume, said end stud flange being forced by said jet pressure to rotate in variable relation with said jet action, in coaction with said fixed cam integrally connected, said satellite gears circling around variably but in fixed relation with said stud flange and said cam, said variation changing the speed of rotation of said satellite gears for changing said planetary gear drive differential, thereby changing said power take-off speed on said hydraulic vessel.

No references cited.